US008739138B2

(12) United States Patent
Ramidi

(10) Patent No.: US 8,739,138 B2
(45) Date of Patent: *May 27, 2014

(54) CONFLICT RESOLUTION IN APPLICATIONS

(75) Inventor: Madhusudhan R Ramidi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1001 days.

This patent is subject to a terminal disclaimer.

(21) Appl. No.: 12/718,636

(22) Filed: Mar. 5, 2010

(65) Prior Publication Data

US 2011/0219356 A1 Sep. 8, 2011

(51) Int. Cl.
*G06F 9/45* (2006.01)

(52) U.S. Cl.
USPC .......................................... 717/140; 719/331

(58) Field of Classification Search
None
See application file for complete search history.

(56) References Cited

U.S. PATENT DOCUMENTS

| | | | | |
|---|---|---|---|---|
| 6,018,628 | A * | 1/2000 | Stoutamire | 717/147 |
| 7,032,213 | B1 * | 4/2006 | Lupu et al. | 717/129 |
| 7,219,329 | B2 | 5/2007 | Meijer et al. | |
| 2005/0015676 | A1 * | 1/2005 | Zatloukal et al. | 714/38 |
| 2007/0294702 | A1 * | 12/2007 | Melvin et al. | 718/104 |
| 2008/0127156 | A1 * | 5/2008 | Buza et al. | 717/166 |
| 2008/0256564 | A1 * | 10/2008 | Fathalla | 719/331 |
| 2011/0214016 | A1 * | 9/2011 | Gschwind | 714/16 |

OTHER PUBLICATIONS

Gert Boddaert, "How to do run-time (or explicit) linking of C++ plug-in components and objects",—http://www.codeproject.com/KB/DLL/plug-in.aspx?fid=8&df=90&mpp=25&noise=3&sort=Position&view=Quick&select=180080,—2000.
Jimmy Wales, "Dynamic linker", [online], [Retrieved on Feb. 25, 2010]. Retrieved from the Internet at <http://en.wikipedia.org/wiki/Dynamic_linker>, 3 pages.
"What does LD_PRELOAD signify?" http://www.unix.com/unix-advanced-expert-users/25917-what-does-ld_preload-signify.html, Copyright © 2000-2006, Jelsoft Enterprises Limited. Language Translations Powered by . vBCredits v1.4 Copyright © 2007-2008, PixelFX Studios.
Austin Godber, "LD_PRELOAD"—http://uberhip.com/people/godber/interception/html/slide_5.html, 2002.
Greg Nakhimovsky, "Debugging and Performance Tuning with Library Interposers"—http://developers.sun.com/solaris/articles/lib_interposers.html, Jul. 2001.

(Continued)

*Primary Examiner* — Neveen Abel Jalil
*Assistant Examiner* — Karina Levitian
(74) *Attorney, Agent, or Firm* — North Shore Patents, P.C.; Michele Liu Baillie

(57) ABSTRACT

A method, a system and computer program product for resolving conflicts in applications are disclosed, A first set of instructions configured to use a second set of instructions is identified during execution of a program having the first set of instructions. A third set of instructions couples the first set of instructions to the second set of instructions. I Incompatibility between the first set of instructions and the second set of instructions is identified, in response to compiling the first set of instructions and compiling the second set of instructions. A mechanism is provided for the third set of instructions to modify the second set of instructions, which result in a modified second set of instructions compatible with the first set of instructions.

4 Claims, 4 Drawing Sheets

(56) References Cited

OTHER PUBLICATIONS

Silvio Cesare, "Shared Library Call Redirection via ELF PLT Infection", Pharack Magazine, vol. 0xa, Issue 0x38, May 1, 2000—http://www.phrack.com/issues.html?issue=56&id=7.

K. Horton et al., "Method and Framework for Runtime Verification of Library Usage", IP.com Electronic Publication, Jul. 25, 2008.

SG Carley et al., "Dynamic and Transparent Loading of Dynamic Link Libraries in an OO Environment", IP.com Electronic Publication, Mar. 26, 2005.

* cited by examiner

CONFLICT RESOLUTION IN APPLICATIONS

BACKGROUND

In conventional computer systems, a runtime environment is a collection of executable instructions that provides an operative foundation for execution of other applications. Typically, a runtime environment includes one or more libraries of commands that other applications may utilize to accomplish computing tasks. The implementation of a runtime environment typically depends on the underlying computer system and may depend on the underlying hardware architectures, software operating system, or a combination thereof. The applications may be compiled into an intermediate language that is understood by multiple implementations of the runtime environments.

In some cases, one or more of the commands available in a particular implementation of a runtime environment may not be supported by another implementation of the runtime environment. If an application uses a command that is unsupported by a particular implementation of a runtime environment, then such an application may not be able to execute correctly using that particular implementation of the runtime environment. In some other cases, if a reference to an unsupported command is encountered during the execution of a program of an application, an error may occur or the application may function undesirably.

BRIEF SUMMARY

Embodiments of the invention are directed to a method, a system and a computer program product for resolving conflicts in applications. Accordingly, embodiments of the invention identify a first set of instructions configured to use a second set of instructions during execution of a program having the first set of instructions, and a third set of instructions configured to couple the first set of instructions to the second set of instructions. Embodiments further identify incompatibility between the first set of instructions and the second set of instructions in response to compiling the first set of instructions and compiling the second set of instructions, and provide a mechanism for the third set of instructions to modify the second set of instructions, resulting in a modified second set of instructions, wherein the modified second set of instructions is compatible with the first set of instructions.

BRIEF DESCRIPTION OF THE SEVERAL VIEWS OF THE DRAWINGS

Embodiments of the invention are described in detail below, by way of example only, with reference to the following schematic drawings, where.

DETAILED DESCRIPTION

A runtime environment typically includes one or more libraries of commands that other applications may utilize to accomplish computing tasks. Interfaces to such libraries are commonly referred to as application programming interfaces (APIs). For example, a given API may provide access to commands for user input, audio-video output, networking, file management etc.

Conventionally, many dynamic link libraries (DLL) are packaged with exposed interfaces for an application executable. The executable is adapted to load the DLL and use the interfaces packaged. If the executable and the DLL use different runtime libraries while building, it may create incompatible runtimes. This may result in malfunction or even a system crash.

Figure 1:
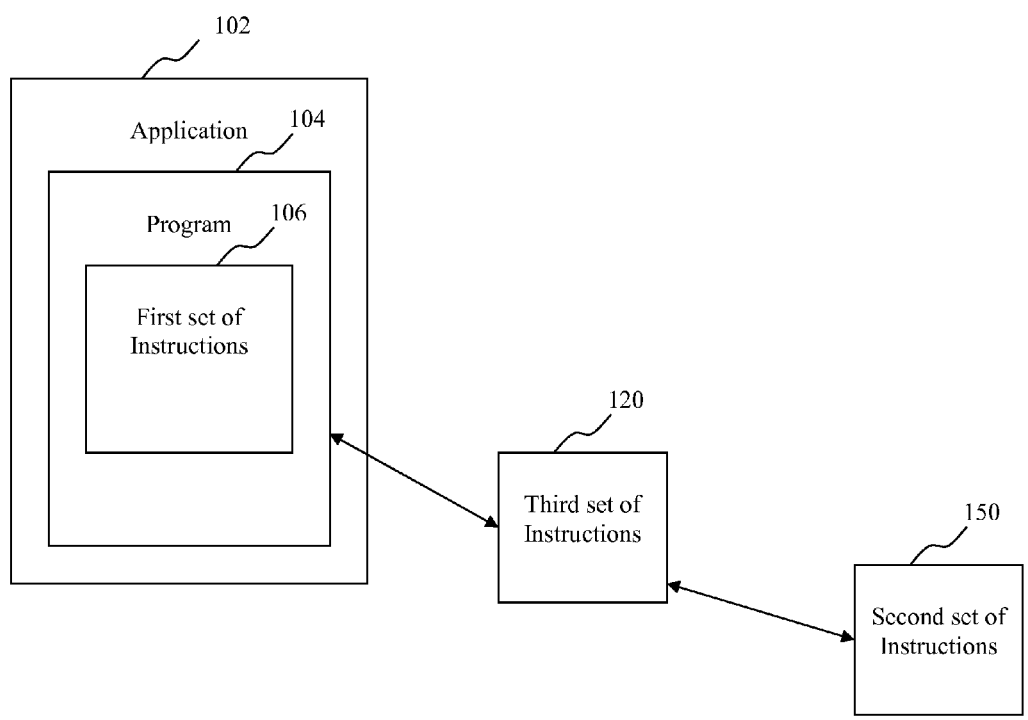
FIG. 1 shows a conventional, prior art schematic of interaction of multiple set of instructions communicatively coupled in a typical dynamic programming environment.

Embodiments of the invention are directed to a method, a system and a computer program product for resolving conflicts in applications. FIG. 1 shows a conventional schematic 100 of interaction of multiple set of instructions communicatively coupled in a typical dynamic programming environment. FIG. 1 depicts an application 102 having a program 104, which in turn has a first set of instructions 106. A program executable of program 104 may need to load a third set of instructions 120. The third set of instructions 120 may further need to access a second set of instructions 150. In an exemplary mode, each of the first set of instructions, the second set of instructions and the third set of instructions is written in a programming language supporting function addresses. The programming language is selected from a set including C, C++, and Pascal. At least one of the first set of instructions, the second set of instructions and the third set of instructions is a runtime code, and the third set of instructions is a dynamic link library (DLL). If the executable and the DLL use different runtime libraries while building, it may create incompatible runtimes. This may result in a malfunction or even a system crash. In an exemplary mode, if the compilation of C code is done using two different compilers, there may be conflicts that arise due to the difference in compilers and the C code may not work in different runtime environments, causing a malfunction or a failure.

Figure 2:
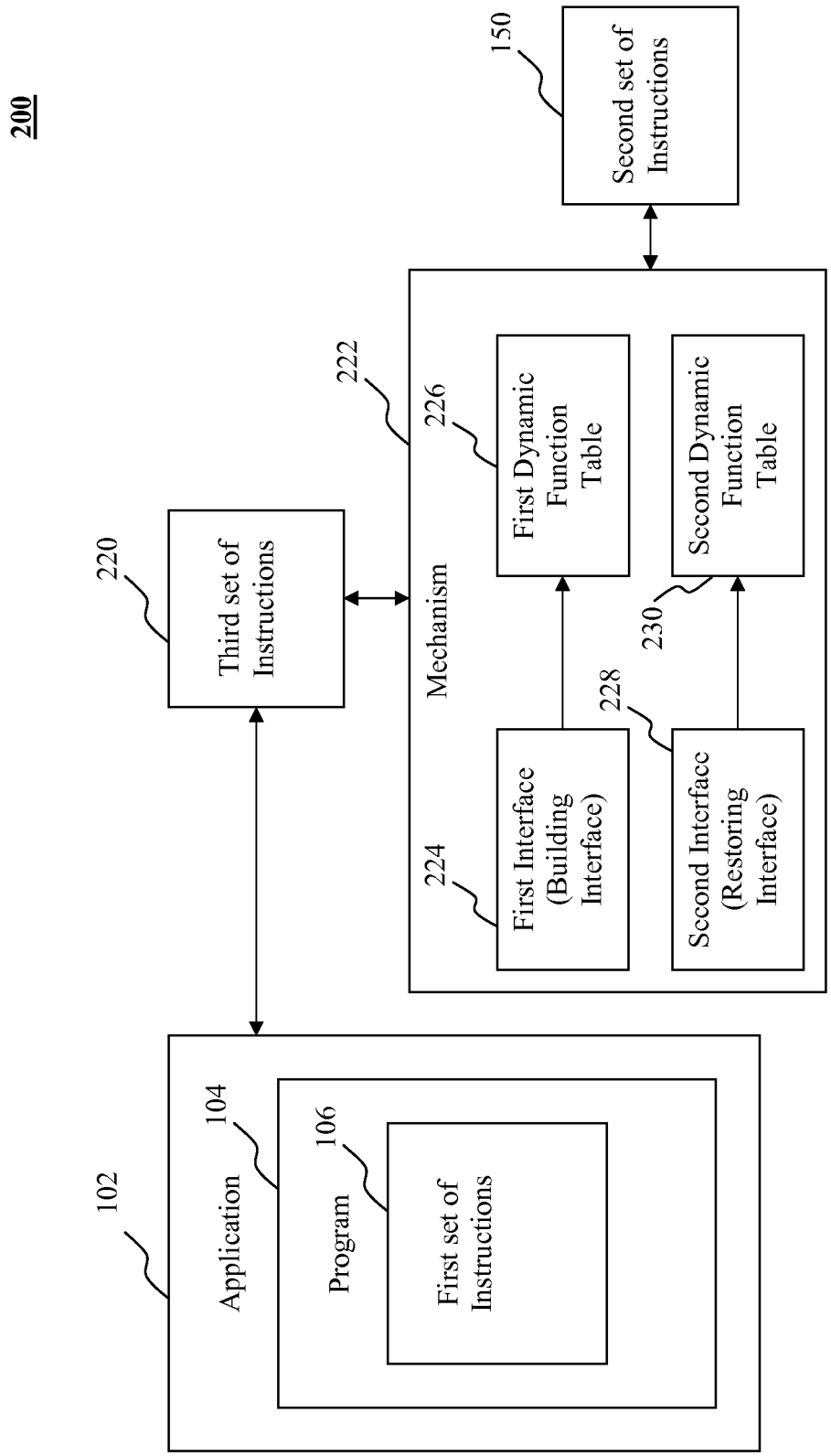
FIG. 2 shows a schematic of a mechanism of resolving conflicts in applications where multiple set of instructions are coupled according to an exemplary embodiment of the invention.

FIG. 2 shows a schematic 200 of a mechanism for resolving conflicts in applications where multiple set of instructions are coupled according to an exemplary embodiment of the invention. FIG. 2 depicts an application 102, having a program 104, which in turn has a first set of instructions 106. A program executable of program 104 may need to load a third set of instructions 220 (corresponding to third set of instructions 120 of FIG. 1). Third set of instructions 220 may further need to access a second set of instructions 150. In an exemplary mode, each of the first set of instructions, the second set of instructions and the third set of instructions is written in a programming language, such as, for example, C, C++ or Pascal, those which support function addresses. In an exemplary mode, first set of instructions 106 and second set of instructions 150 are runtime codes and third set of instructions 220 is a DLL.

FIG. 2 further depicts a mechanism 222 for the third set of instructions 220 to modify second set of instructions 150. FIG. 2 depicts a first interface 224. First interface 224 can also be referred to as a building interface 224, since it is used to set appropriate runtime. A backup of first set of instructions 106 is taken and replaced with a compatible version of second set of instructions 150. Correspondingly, first interface 224 builds a first dynamic function table 226 setting the pointer to the compatible set of instructions. After the executable of program 106 has used the compatible set of instructions, restoring first set of instructions 106 is desirable for other components of program 104 to run smoothly. To achieve this, a second interface 228 is used. Second interface 228 can also be referred to as a restoring interface 228, since is used to reset the appropriate runtime. The backup of first set of instructions 106 replaces the compatible version of the second set of instructions. Correspondingly second interface 228 builds a second dynamic function table 230, resetting the pointer to the first set of instructions 106.

Figure 3:
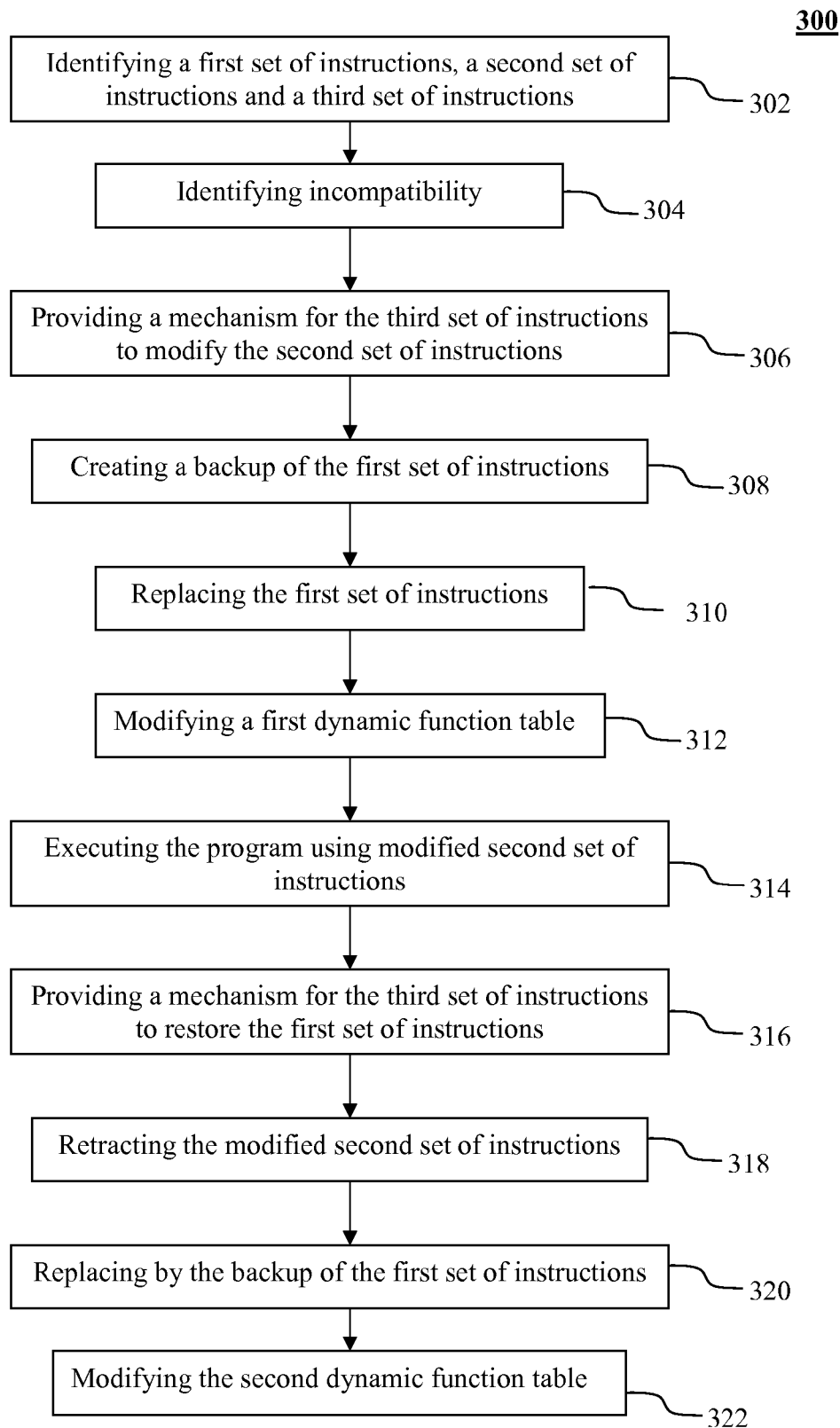
FIG. 3 shows a flow chart for resolving conflicts in applications as disclosed in one embodiment of the invention.

FIG. 3 shows a flow chart of a method 300 for resolving conflicts in applications as disclosed in one embodiment of the invention. Step 302 depicts identifying a first set of instructions configured to use a second set of instructions during execution of a program having the first set of instructions, and a third set of instructions configured to couple the first set of instructions to the second set of instructions. Step 304 depicts identifying incompatibility between the first set of instructions and the second set of instructions in response to compiling the first set of instructions and compiling the second set of instructions. Step 306 depicts providing a mechanism for the third set of instructions to modify the second set of instructions, resulting in a modified second set of instructions, wherein the modified second set of instructions is compatible with the first set of instructions, and wherein step 306 is performed by a first interface. Step 308 depicts creating a backup of the first set of instructions and step 310 depicts replacing the first set of instructions by the modified second set of instructions. Step 312 depicts modifying a first dynamic function table corresponding to the steps of the creating and the replacing. In one embodiment of the invention, the first interface may be configured to perform one or multiple steps from step 308, step 310 and step 312. Step 314 depicts executing the program using the modified second set of instructions. Step 316 shows providing a mechanism for the third set of instructions to restore the first set of instructions to its original state, wherein step 316 is performed by a second interface. Step 318 depicts retracting the modified second set of instructions and step 320 shows replacing the modified second set of instructions by the backup of the first set of instructions. Step 322 shows modifying a second dynamic function table corresponding to the steps of the retracting and the replacing the modified second set of instructions. According to another embodiment of the invention, the second interface may be configured to perform one or multiple steps from step 318, step 320 and step 322.

Figure 4:
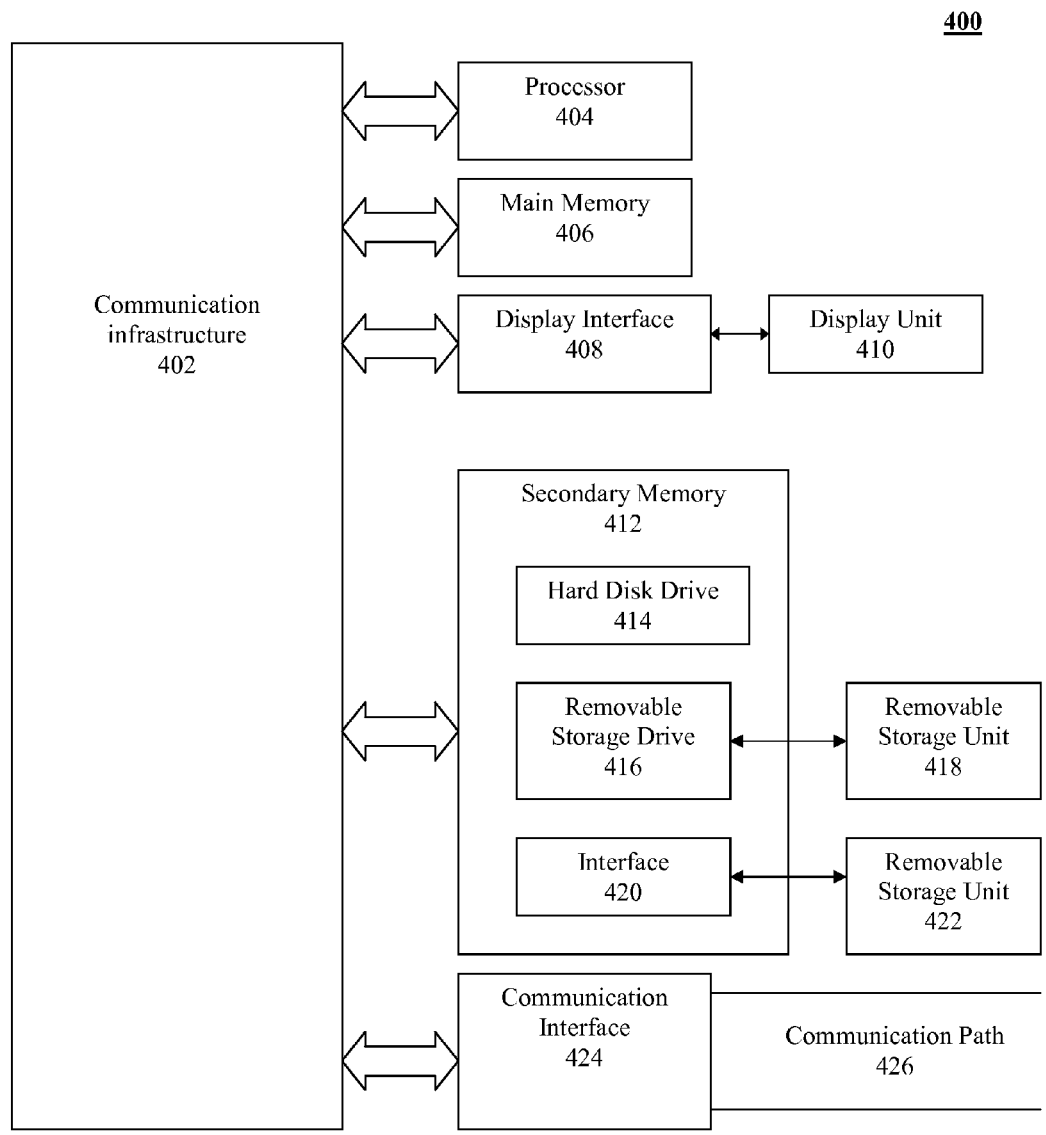
FIG. 4 shows a detailed schematic of a computer system used for resolving conflicts in applications as disclosed in FIG. 2.

FIG. 4 shows a detailed schematic of a computer system used for resolving conflicts in applications. FIG. 4 is a block diagram of an exemplary computer system 400 that can be used for implementing various embodiments of the invention. In some embodiments, the computer system 400 can be used as a system executing the schematic 200 of FIG. 2. The computer system 400 can also be used to perform the steps described in FIG. 3. The computer system 400 includes at least a processor 404. It should be understood although FIG. 4 illustrates a single processor, one skilled in the art would appreciate that more than one processor can be included as needed. The processor 404 is connected to a communication infrastructure 402 (for example, a communications bus, cross-over bar, or network) where the communication infrastructure 404 is configured to facilitate communication between various elements of the exemplary computer system 400. Various software embodiments are described in terms of this exemplary computer system. After reading this description, it will become apparent to a person of ordinary skill in the relevant art(s) how to implement the invention using other computer systems and/or computer architectures.

Exemplary computer system 400 can include a display interface 408 configured to forward graphics, text, and other data from the communication infrastructure 402 (or from a frame buffer not shown) for display on a display unit 410. The computer system 400 also includes a main memory 406, which can be random access memory (RAM), and may also include a secondary memory 412. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. The removable storage unit 418, represents, for example, a floppy disk, magnetic tape, optical disk, etc. which is read by and written to by the removable storage drive 416. As will be appreciated, the removable storage unit 418 includes a computer usable storage medium having stored therein computer software and/or data.

In exemplary embodiments, the secondary memory 412 may include other similar means for allowing computer programs or other instructions to be loaded into the computer system. Such means may include, for example, a removable storage unit 422 and an interface 420. Examples of such may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system 400.

The computer system 400 may also include a communications interface 424. The communications interface 424 allows software and data to be transferred between the computer system and external devices. Examples of the communications interface 424 may include a modem, a network interface (such as an Ethernet card), a communications port, a PCM-CIA slot and card, etc. Software and data transferred via the communications interface 424 are in the form of signals which may be, for example, electronic, electromagnetic, optical, or other signals capable of being received by communications interface 424. These signals are provided to the communications interface 424 via a communications path (that is, channel) 426. The channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 406 and the secondary memory 412, the removable storage drive 416, a hard disk installed in the hard disk drive 414, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network that allows a computer to read such computer readable information.

Computer programs (also referred to herein as computer control logic) are stored in the main memory 406 and/or the secondary memory 412. Computer programs may also be received via the communications interface 424. Such computer programs, when executed, can enable the computer system to perform the features of exemplary embodiments of the present invention as discussed herein. In particular, the computer programs, when executed, enable the processor 404 to perform the features of the computer system 400. Accordingly, such computer programs represent controllers of the computer system.

Embodiments of the invention further provide a storage medium tangibly embodying a program of machine-readable instructions executable by a digital processing apparatus to carry out a method of resolving conflicts in applications as described in the various embodiments set forth above and described in detail. Embodiments of the invention further provide a system for resolving conflicts in applications, the system including at least one processor and at least one memory.

Advantages of various embodiments of the invention include potential reduction in malfunctions, runtime exceptions, invalid memory allocations or/and errors in program executions which employs multiple runtime codes compiled using different compiling systems. Advantages of various embodiments of the invention include resolving mismatched runtimes by constructing runtimes dynamically without the need to recompile and rebuild the DLLs.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the invention.

What is claimed is:

1. A system for resolving conflicts in applications, the system comprising at least one processor and at least one memory, wherein the processor is adapted to:
  identify a set of instructions configured to use a set of runtime libraries during execution of a program having the set of instructions;
  load a dynamic link library (DLL) configured to couple the set of instructions to the set of runtime libraries;
  identify incompatibility between the set of instructions and the set of runtime libraries due to the program and the DLL being compiled using different compilers;

provide an interface for the DLL to:
  modify the set of runtime libraries, resulting in a modified set of runtime libraries, wherein the modified set of runtime libraries is compatible with the set of instructions, and
  build a first dynamic function table setting a function pointer to the modified set of runtime libraries;
replace the set of runtime libraries with the modified set of runtime libraries; and
execute the program using the modified set of runtime libraries and the first dynamic function table.

2. A computer program product for resolving conflicts in applications, the computer program product comprising:
  a non-transitory computer readable medium having computer readable program code embodied therewith, the computer readable program code comprising computer readable program code configured to:
  identify a set of instructions configured to use a set of runtime libraries during execution of a program having the set of instructions;
  load a dynamic link library (DLL) configured to couple the set of instructions to the set of runtime libraries;
  identify incompatibility between the set of instructions and the set of runtime libraries due to the program and the DLL being compiled using different compilers;
  provide an interface for the DLL to:
    modify the set of runtime libraries, resulting in a modified set of runtime libraries compatible with the set of instructions, and
    build a first dynamic function table setting a function pointer to the modified set of runtime libraries;
  replace the set of runtime libraries with the modified set of runtime libraries; and
  execute the program using the modified set of runtime libraries and the first dynamic function table.

3. The system of claim 1, wherein the processor is further adapted to:
  create a backup of the set of runtime libraries prior to replacing the set of runtime libraries with the modified set of runtime libraries; and
  after the program executes using the modified set of runtime libraries, provide a second interface for the DLL to replace the modified set of runtime libraries with the backup of the set of runtime libraries and build a second dynamic function table resetting the function pointer to the set of runtime libraries.

4. The computer program product of claim 2, wherein the computer readable program code is further configured to:
  create a backup of the set of runtime libraries prior to replacing the set of runtime libraries with the modified set of runtime libraries; and
  after the program executes using the modified set of runtime libraries, provide a second interface for the DLL to replace the modified set of runtime libraries with the backup of the set of runtime libraries and build a second dynamic function table resetting the function pointer to the set of runtime libraries.

* * * * *